Oct. 30, 1923.
J. McCARTHY
AUTOMOBILE SIGNAL
Filed May 17, 1921
1,472,248
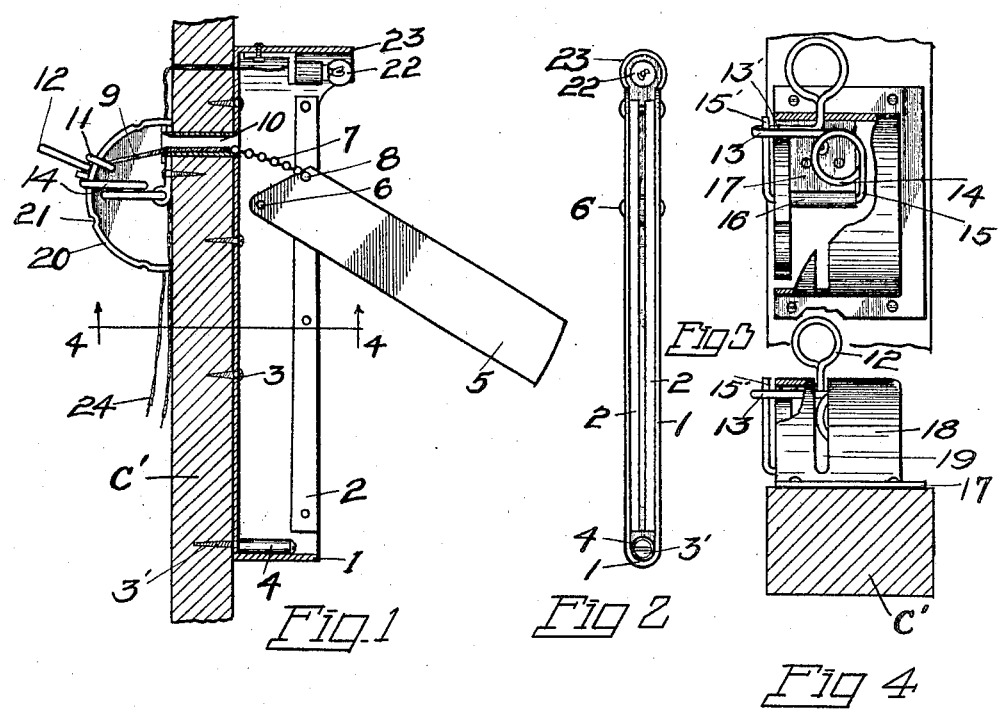
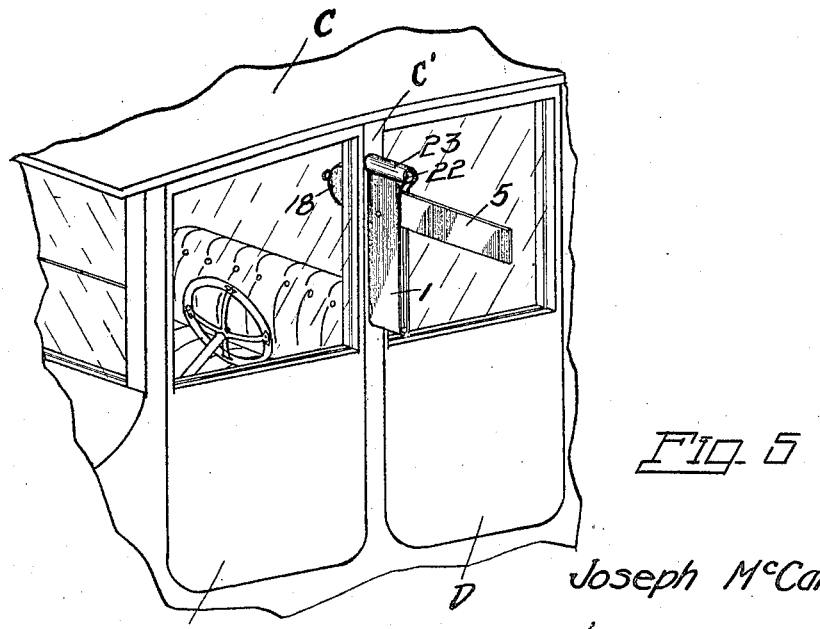
Joseph McCarthy
Inventor
By Herbert E. Smith
Attorney Patented Oct. 30, 1923.

1,472,248

UNITED STATES PATENT OFFICE.

JOSEPH McCARTHY, OF SPOKANE, WASHINGTON.

AUTOMOBILE SIGNAL.

Application filed May 17, 1921. Serial No. 470,357.

*To all whom it may concern:*

Be it known that I, JOSEPH McCARTHY, a citizen of the United States, residing at Spokane, in Spokane County and State of Washington, have invented certain new and useful Improvements in Automobile Signals, of which the following is a specification.

My present invention relates to improvements in automobile signals of the semaphore or laterally swinging indicator type, especially designed for use on closed cars, whereby the driver of the car may indicate direction of movement to the right or left, or stop, by actuation of the signal semaphore located outside the closed car. In use a single arm is displayed in horizontal position for a left hand turn; the raised arm at an angle of 45 degrees indicating a right hand turn, and the lowered arm at an angle of 45 degrees indicating a stop. The primary object of the invention is the provision of means for manipulating the single arm or semaphore to move it to any one of these several positions and retain the arm in selected position, for indicating purposes, and to this end the invention consists in certain novel combinations and arrangements of parts whereby the signal arm is operated, and illuminated at night, as will be more clearly set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in vertical elevation through a portion of an automobile body, showing the device of the invention attached thereto, the exterior housing being in section, and the interior housing for the operating parts also being shown in section, with the semaphore in position to indicate a right turn.

Figure 2 is an edge view of the laterally swinging arm in its housing.

Figure 3 is a view in elevation, as seen from the left in Figure 1, showing the manipulating lever for elevating the arm, and the housing at the interior of the car broken away for convenience of illustration.

Figure 4 is a partial sectional view at line 4—4 of Figure 1 looking up.

Figure 5 is a view in perspective of a portion of a closed passenger car or automobile, showing the relation thereto of the signal.

In this view, Figure 5 the car body is designated as a whole by the letter C and the two doors as D D, with a frame post as C' between the doors to which the signal device is attached with the signal on the exterior and the operating mechanism on the interior of the car body.

The metallic housing 1 is attached to this post and provided with side strips 2 of felt or similar material, and by means of screws 3 the vertically extending housing is affixed to the post. At the lower rounded end of the housing a longer screw 3' is utilized in connection with the sleeve 4, which serve to strengthen the attachment of the housing to the bar or post C' to insure a stable and rigid support for the laterally swinging arm or semaphore 5. The semaphore is a flat blade of metal, wood, or other suitable material and properly colored, being substantially rectangular in shape and of a width to freely swing within the housing, the felt strips at the sides thereof being adapted to guide the blade and also perform the functions of anti-rattlers, thus preventing noise due to vibrations of the moving car.

In normal, retracted position, the semaphore is designed for suspension within the housing, where it is invisible, a pivot 6 being provided at one of the upper corners of the blade, and at the outer upper corner of the blade a metallic chain 7 is attached as at 8. From the normal, invisible, verticle position the semaphore may be elevated, by a pull on the chain 8 and its extension cord 9, to either of the three positions heretofore mentioned, and the cord and chain are guided through a metallic sleeve or tube 10 extending transversely through an opening provided therefor in the post C' as in Figure 1.

At 11 the pull cord is attached to an eye formed as an integral part of the lever handle 12, and these parts form members, fashioned from a single piece of wire, of the signal actuating mechanism located within the interior of the closed car.

In Figure 3 it will be seen that the handle portion or ring 12 merges into a return bend 13 of the wire piece, and that this return bend, or horizontal bar 13 is coiled as at 14 to form a spring. From the spring the wire is merged into a U-shaped yoke 15, which, at its free end 15' is embraced by the extremity of the horizontally extending arms 13 and 13'. The single piece of wire is thus fashioned into a lever comprising the handle portion 12, the frictional arm 13 and the spring 14, together with the U-shape yoke 14, and the lever is pivoted, through the yoke 14 in a sleeve 16 which latter is formed from the base plate 17 of a lever housing 18. The housing is semi-cylindrical in shape and provided with a circumferential slot 19 through which the handle 12 projects. The housing is attached by its base plate 17 to the inner face of the upright bar C' and the handle 12, which stands in normal position at the top of the housing, as in Figure 3, is adapted to be swung downwardly for operating the semaphore.

In connection with the friction arm 13 I employ a friction plate 20 of arc shape and located within the housing, which plate is provided with indentations 21 spaced at predetermined intervals in its curved periphery, and it will be apparent that the tension of the spring 14 of the lever will hold the arm 13 in close frictional contact with the arcuate plate 20. Thus, by reference to Figure 1 it will be seen that the handle 12 has pushed downwardly to swing the lever in its pivot sleeve 16, and through the cord and chain the semaphore has been swung upwardly to position to indicate a right hand turn. The friction between the friction arm of the lever and the friction plate 20 is sufficient to hold the frictional members to prevent jerky movement of the laterally swinging arm or semaphore, and the resiliency of the spring 14, when the arm 13 reaches an indentation or depression 21, causes the arm to seat in this depression or notch, to hold the arm, and through it, the semaphore, in predetermined position. The arc-plate 20 with its notches 21 thus forms a ratchet plate with frictional bearing face for the frictional arm 13 of the lever, and this arm of the lever forms a latch for engagement with these notches 21 in the plate 20 for locking the semaphore in uplifted position as described, The semaphore is returned by gravity to normal position within the housing 1 when the lever is returned to normal position as indicated in Figure 3.

For illuminating the semaphore at night, I utilize an electric lamp 22 located in the circular casing 23 formed at the upper end of the semaphore housing, and the lamp is included in an electric circuit of which the wires are designated 24 in Figure 1.

From the above description taken in connection with my drawings it is evident that I have provided a simple, compact, and effective instrumentality for performing the functions of such a device. The lever housing in the interior of the car may be ornamented to conform to the trimmings of the car and is located in accessible position for the driver of the car, and yet not occupy unnecessary or excessive space therein, and the semaphore and its housing located on the exterior of the closed car, because of their compact arrangement, occupy comparatively small space and do not project to an undue extent beyond the lines of the car.

Having thus fully described my invention, what I claim as new and desire to secure by Letters Patent is—

The combination with a laterally swinging gravity returned, signal arm, of a pivoted yoke shape lever and flexible connection between said lever and arm, an integral spring member fashioned in said lever and a friction arm under influence of said spring, a slotted housing for the lever and a notched arcuate friction plate in said housing, said friction arm in continuous engagement with said plate and adapted to engage a selected notch therein.

In testimony whereof I affix my signature.

JOSEPH McCARTHY.